United States Patent Office 2,806,655
Patented Sept. 17, 1957

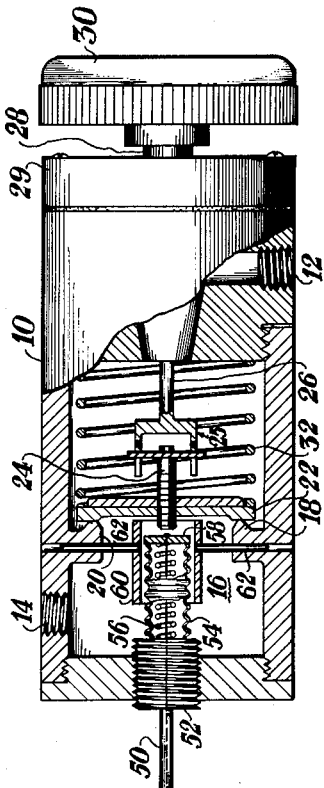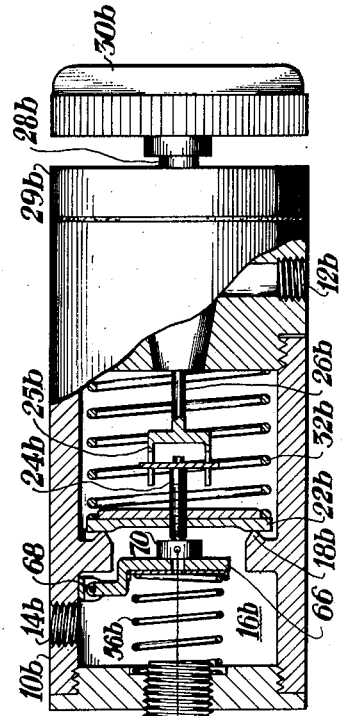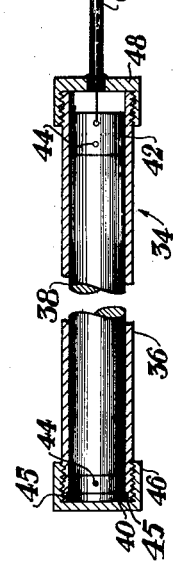

2,806,655

THERMOSTATIC CONTROL DEVICE

Charles K. Strobel, Pittsburgh, and Guy F. Conner, Jeannette, Pa., assignors to Robertshaw-Fulton Controls Company, Greensburg, Pa., a corporation of Delaware Application May 18, 1955, Serial No. 509,180

13 Claims. (Cl. 236—102)

This invention relates to thermostatic control devices for fluid fluel burning appliances and more particularly to thermostatic control devices for use in extremely high temperature applications.

Thermostatic control devices in present use employing thermostatic elements of the rod and tube type or the hydraulic type have been found to be unsatisfactory for use in extremely high temperature applications. Hydraulic elements charged with metallic fluids can be used at higher temperatures, but are limited in use because of the high cost, relatively low expansion coefficients, and difficulties in handling the fluid.

The presently used rod and tube type thermostatic element has been found to be unsatisfactory for high temperature use because of the direct rigid connection to the actuator. Therefore, it is an object of this invention to incorporate in a thermostatic control device, an indirect connection between the rod and tube and actuator which will permit high temperature applications of the device.

Another object of the invention is to incorporate in a thermostatic control device, a flexible connection between the rod and tube and the actuator which will permit the position of the rod and tube to be varied relative to the actuator without affecting the operation or calibration of the device.

In the preferred embodiment of the invention, a casing having an inlet and an outlet for fluid is provided with valve means for controlling the flow of fluid therethrough. A thermal element comprising a rod and tube is positioned exteriorly of the casing and connected thereto by a flexible tube. The rod is operatively connected to the valve means by a flexible wire which extends through the flexible tube and has one end connected to the rod, the other end being connected to a flexible bellows within the casing. Biasing means is provided which tend to maintain the wire in a taut condition and tend to bias a movable end of the bellows into engagement with the valve means.

Other objects and advantages will appear from the following specification taken in connection with the accompanying drawings wherein:

Fig. 1 is an elevation, partly in section, of a control device embodying the invention;

Fig. 2 is an elevation, partly in section, of another embodiment of the invention.

Fig. 3 is an enlargement of a portion of Fig. 1 clearly showing the structural details of the free end of the thermal element.

Referring more particularly to the embodiment shown in Fig. 1, the thermostatic control device includes a main casing 10 provided with an inlet 12 and an outlet 14 for fluid fluel. The inlet 12 and outlet 14 communicate with a valve chamber 16 within which an annular valve seat 18 is formed on the casing 10 to define a valve port 20 through which fluid fluel may flow from the inlet 12 to the outlet 14.

A disc shaped valve member 22 is positioned within the chamber 16 to be reciprocable into and out of engagement with the valve seat 18. A reciprocable and rotatable valve stem 24 has one end threaded through the valve member 22 and the other end connected by a suitable torque transmitting connection 25 to one end of an adjusting shaft 26. The other end of the adjusting shaft 26 is connected to an operating shaft 28 which is supported by a cap 29 secured to the casing 10 and extends exteriorly thereof to carry the usual adjustment dial 30. A spring 32 encircles the stem 24 and shaft 26 and is mounted in compression between the valve member 22 and the casing 10 to bias the valve member 22 toward the seat 18.

It can be seen that upon rotation of the dial 30, the valve stem 24 will be rotated to vary the position of its end with respect to the valve 22. The device thus far described is well known in the art and further description is deemed unnecessary.

A thermal element 34 is positioned exteriorly of the casing 10 and indirectly connected to the valve member 22. The thermal element 34 comprises a metal tube 36 and a rod 38 positioned within the tube 36. The tube 36 and rod 38 may be of any suitable materials having different coefficients of thermal expansion. In this embodiment the tube 36 is formed of a metallic alloy having a large positive coefficient of expansion and the rod 38 is formed of a ceramic material such as a lithium alumina silicate composition having a negative coefficient of expansion. Thus, a large degree of relative movement is obtained in response to a temperature variation of the tube 36 and rod 38.

Each end of the rod 39 is diminished in diameter and respectively fixed within bores of metal cylindrical shaped cups 40 and 42 by pins 44. As best shown in Fig. 3, the cup 40 is provided with a flange 45 which engages a shoulder on the free end of the tube 36 to limit movement of the rod 38 toward the cup 42. The cup 40 is fixed to the end of the tube 36 by an adjustment cap 46 which is suitably threaded on the end of the tube 36. A second adjustment cap 48 is threaded on the other end of the tube 36 and cooperates with the cap 46 to enable the length of the tube 36 to be adjusted.

The thermal element 34 is connected to the casing 10 by a flexible tube 50 which has one end fixed within a bore in the adjustment cap 48 and the other end fixed within a bushing 52 which is threaded in the end of the casing 10. A flexible bellows 54 is attached to the interior end of the bushing 52 and extends toward the valve stem 24 to be axially aligned therewith. A spring 56 is mounted in compression within the bellows 54 between the bushing 52 and the movable end 58 of the bellows 54 and serves to bias the movable end 58 toward engagement with the valve stem 24. Axial alignment of the bellows 54 with the stem 24 is maintained by a tubular guide 60 which is attached to the casing 10 by two supports 62.

It is to be noted that the bellows 54 seals the interior of the tube 50 and thermal element 34 from the exterior of the casing 10 and thus enables the tube 50 and thermal element and bellows to be hermetically sealed with an inert gas to resist internal corrosion.

The movable end 58 of the bellows 54 is connected to the rod 38 by a flexible wire 64 which has one end attached to the movable end 58 and extends through the tube 50 to have the other end attached to the cup 42. The wire 64 and tube 50 are preferably made of essentially the same materials to avoid differential expansion and the need for compensation.

It can be seen that the spring 56 maintains the wire 64 in a taut condition by biasing the movable end 58 toward the valve stem 24. Should the temperature of the rod 38 and tube 36 decrease, relative movement will occur therebetween causing movement of the rod 38 toward the casing 10. This will allow movement of the wire 64 and movable end 58 toward the valve stem 24 under the bias of the spring 56. The spring 56 is preferably made stronger than the spring 32 so as to cause compression of the spring 32 upon movement of the valve stem 24 by the movable end 58.

In the operation of the embodiment shown in Fig. 1, the casing 10 may be attached by a suitable means to a supporting structure such as a control panel, and the thermal element 54 is positioned in a medium where thermostatic control is desired. Should the temperature of the thermal element 34 increase, the tube 36 will expand and the rod 38 will contract resulting in movement of the end of the rod 38 away from the casing 10. The rod 38 pulls the wire 64 through the tube 60 which in turn moves the movable end 58 toward the bushing 52 to allow closure of the valve 22 under the bias of the spring 32.

Should the temperature of the thermal element 34 decrease, expansion of the rod 38 and contraction of the tube 36 will occur and the wire 64 will be moved in an opposite direction to allow movement of the movable end 58 by the spring 56. Since the spring 56 is stronger than the spring 32, the movable end 58 will cause movement of the valve 22 away from the seat 18 to compress the spring 32.

Should it be desired to reposition the thermal element 34 relative to the casing 10, the tube 36 and wire 64 may be readily flexed to a new position without affecting the calibration of the device. This is one of the main features of this invention.

The modified construction illustration by Fig. 2, in which parts corresponding to parts heretofore described are designated by corresponding reference numerals having the suffix "b," is a departure from that shown in Fig. 1 in that a lever type actuating means has been substituted for the bellows arrangement as shown in Fig. 1 and the rod 38 is slidably mounted within the tube 36.

More particularly, the actuating means in Fig. 2 comprises a lever 66 pivoted on the casing 10b by a bracket 68. The wire 64b extends through the tube 50b to have one end attached to an operating button 70 formed on the lever 66. In this case the spring 56b is mounted in compression between the lever 66 and the casing 10b and is operative to bias the lever 66 toward engagement with the stem 24b.

The other end of the wire 64b is connected to a disc 72 slidably mounted within the tube 36b. In this embodiment, the rod 38b is slidably mounted in the tube 36b and biased toward the free end thereof by a spring 74. The spring 74 is mounted in compression between the end of the tube 36b and the disc 72 and is operative to bias the disc 72 into engagement with the rod 38b and the assembly of the rod 38b and disc 72 toward the free end of the tube 36b. Thus, in this embodiment, the rod 38b is biased into engagement with the end of the tube 36b rather than fixed as shown in Fig. 1.

The operation of the embodiment shown in Fig. 2 is substantially the same as the embodiment shown in Fig. 1, with the exception that the lever 66 replaces the bellows actuating means of Fig. 1.

It will be apparent that various changes may be made in the form and arrangement of parts and the details of construction herein disclosed without departure from the scope of the invention as defined in the appended claims.

I claim:

1. In a thermostatic control device, the combination comprising a casing, control means in said casing movable between controlling positions, actuating means for said controlling means, a hollow elongated thermal element positioned exteriorly of said casing, a rod-like thermal element coaxially mounted within said hollow thermal element, said inner and outer thermal elements having different coefficients of thermal expansion, a sealing and adjustment cap carried on each end of said outer thermal element to selectively vary the length of said outer thermal element, a flexible member connecting said outer thermal element and said casing whereby said thermal elements may be placed in a plurality of positions relative to said casing, flexible means operatively connecting said inner thermal element and said actuating means for transmitting movement therebetween and means cooperable with and substantially coaxial with a portion of said flexible means for keeping said flexible means constantly in tension under all operating conditions of said device.

2. In a thermostatic control device, the combination comprising a casing having inlet and outlet passages for fluid, a valve seat intermediate said passages, a valve member movable between open and closed positions relative to said seat for controlling fluid flow through said passages, a hollow, elongated thermal element positioned exteriorly of said casing, a rod-like thermal element coaxially mounted within said hollow thermal element, said inner and outer thermal elements having different coefficients of thermal expansion, a sealing and adjustment cap carried on each end of said outer thermal element to selectively vary the length of said outer thermal element, flexible means connecting said casing and said outer thermal element whereby said thermal elements may be placed in a plurality of positions relative to said casing, a flexible member associated with said flexible means and operatively connecting said inner thermal element and said valve member for transmitting movement therebetween, and means cooperable with and substantially coaxial with a portion of said flexible member for keeping said flexible member constantly in tension under all operating conditions of said device.

3. In a thermostatic control device, the combination comprising a casing having inlet and outlet passages for fluid, a valve seat intermediate said passages, a valve member movable between open and closed positions relative to said seat for controlling fluid flow through said passages, a stem carried by said valve member and being axially adjustable with respect to said valve member, a movable member mounted in said casing to abut said valve stem and actuate said valve member in response to a change in temperature condition, a hollow, elongated thermal element positioned exteriorly of said casing, a rod-like thermal element coaxially mounted within said hollow thermal element, said outer and inner thermal elements having different coefficients of expansion, a sealing and adjustment cap carried on each end of said outer thermal element to selectively adjust the length of said outer thermal element, a flexible tube connecting said casing and said outer thermal element, a flexible member positioned within said tube and operatively connecting said inner thermal element and said movable member for transmitting movement therebetween, said flexible tube and said flexible member having sufficient flexibility to allow repositioning of said thermal elements, means with respect to said casing without affecting operation of the device, and resilient means cooperable with and substantially coaxial with a portion of said flexible member for keeping said flexible member constantly in tension under all operating conditions of said device.

4. A thermostatic control device as claimed in claim 3 wherein said flexible member comprises a flexible wire extending through said flexible tube and having one end thereof operatively connected to said inner thermal element and the other end thereof operatively connected to said movable member.

5. In a thermostatic control device, the combination comprising a casing having inlet and outlet passages for fluid, a valve seat intermediate said passages, a valve member movable between open and closed positions relative to said seat for controlling fluid flow through said passages, a stem carried by said valve member and axially adjustable with respect to said valve member, actuating means mounted in said casing to abut said valve stem to actuate said valve in response to a change in a temperature condition, means in said casing to adjust said stem, a hollow, elongated thermal element positioned exteriorly of said casing, a rod-like thermal element coaxially mounted within said outer thermal element, said outer and inner thermal elements having different coefficients of thermal expansion, a sealing and adjustment cap carried on each end of said outer thermal element to selectively vary the length of said outer thermal element, a flexible tube connecting said outer thermal element and said casing, a flexible wire extending through said flexible tube and operatively connecting said inner thermal element and said actuating means for causing movement of said valve member in response to temperature variations of said thermal element, said flexible tube and said flexible wire having sufficient flexibility to permit the said thermal elements to be placed in a plurality of positions relative to said casing without affecting the operational accuracy of said device, and resilient means cooperable with and mounted substantially coaxial with a portion of said flexible wire to keep said flexible wire constantly in tension under all operating conditions of said device.

6. A thermostatic control device as claimed in claim 5 wherein said acutating means comprises a lever pivoted on said casing and biased into engagement with said valve stem.

7. A thermostatic control device as claimed in claim 5 wherein said actuating means comprise a flexible bellows member having a movable end biased into engagement with said valve stem.

8. In a thermostatic control device, the combination comprising a casing, a valve seat in said casing, a valve member in said casing movable between open and closed positions relative to said seat, a stem carried by said valve member and being axially adjustable with respect to said valve member, a bellows mounted in said casing and having a free end adapted to abut said valve stem and move said valve member in response to a change in a temperature condition, an outer, tubular thermal element positioned exteriorly of said casing, an inner rod-like thermal element coaxially mounted within said outer thermal element and having reduced diameter end portions, said thermal elements having different coefficients of expansion, a cup member fixedly mounted on each of the reduced diameter end portions of said inner thermal element, one of said cup members having a flange on the outer end thereof adapted to engage the end wall of said outer thermal element, a sealing and adjustment cap carried on each end of said outer thermal element to selectively vary the length of said outer thermal element, a flexible tube connecting said outer thermal element and said casing, a flexible cable extending through said flexible tube and operatively connecting one of said cup members and the free end of said bellows whereby said flexible cable transmits movement between said inner thermal element and said valve member, and resilient means positioned between said casing and the free end of said bellows and mounted substantially coaxial with a portion of said flexible cable for keeping said flexible cable in tension under all conditions of operation of said device, said tensioned cable and said flexible tube having sufficient flexibility to allow repositioning of said thermal elements with respect to said casing without affecting the operation of said control device.

9. A thermostatic control device as claimed in claim 8 wherein said bellows, flexible tube and outer thermal element are hermetically sealed with an inert gas to resist internal corrosion.

10. In a thermostatic control device, the combination comprising a casing, a valve seat in said casing, a valve member in said casing movable between open and closed positions relative to said seat, a stem carried by said valve member and being axially adjustable with respect to said valve member, an apertured bushing extending through a wall in said casing, a bellows mounted in said bushing and having a free end adapted to abut said valve stem to actuate said valve member in response to a change in a temperature condition, guide means in said casing positioned circumferentially of said bellows, an outer tubular thermal element positioned exteriorly of said casing, an inner rod-like thermal element coaxially mounted within said outer thermal element and having reduced diameter end portions, said thermal elements having different coefficients of expansion, a cup member fixedly mounted on each of the reduced diameter end portions of said inner thermal element, one of said cup members having a flange on the outer end thereof adapted to engage the end wall of said outer thermal element, a sealing and adjustment cap carried on each end of said outer thermal element to selectively vary the length of said outer themal element, a flexible tube connecting said outer thermal element and said casing, a flexible cable extending through said flexible tube and operatively connecting one of said cup members and the free end of said bellows whereby said flexible cable transmits movement between said inner thermal element and said valve member, and resilient means positioned between said casing and the free end of said bellows and mounted substantially coaxial with a portion of said flexible cable for keeping said flexible cable in tension under all operating conditions of said device, said tensioned cable and said flexible tube having sufficient flexibility to allow repositioning of said thermal elements with respect to said casing without affecting the operation of said control device.

11. In a thermostatic control device, the combination comprising a casing, a valve seat in said casing, a valve member in said casing movable between open and closed positions relative to said seat, a stem carried by said valve member and being axially adjustable with respect to said valve member, a valve actuating lever rotatably mounted within said casing, an outer tubular thermal element positioned exteriorly of said casing, an inner rod-like thermal element coaxially mounted within said outer thermal element, said thermal elements having different coefficients of thermal expansion, a sealing and adjustment cap carried on each end of said outer thermal element to selectively vary the length of said outer thermal element, a small cylindrical element slidably retained within said outer thermal element, means positioned between said small cylindrical element and one of said adjustment caps for urging said small cylindrical element into engagement with said inner thermal element, a flexible tube connecting said outer thermal element and said casing, a flexible cable extending through said flexible tube and operatively connecting said small cylindrical element and said valve actuating lever whereby said flexible cable transmits movement between said inner thermal element and said valve member, and resilient means positioned between said casing and said valve actuating lever and mounted substantially coaxial with a portion of said flexible cable for keeping said flexible cable in tension under all operating conditions of said device, said tensioned cable and said flexible tube having sufficient flexibility to allow repositioning of said thermal element with respect to said casing without affecting the operation of said control device.

12. A thermostatic control device as claimed in claim 11 wherein said casing is provided with inlet and outlet passages for fluid and said valve member is movable between open and closed positions relative to said seat for controlling fluid flow through said passages.

13. In a thermostatic control device, the combination comprising a casing, a valve seat in said casing, a valve member in said casing movable between open and closed positions relative to said seat, a stem carried by said valve member and being axially adjustable with respect to said valve member, a valve actuating lever rotatably mounted within said casing, said actuating lever having a passage therethrough, an apertured bushing extending through one wall of said casing, an outer, tubular thermal element positioned exteriorly of said casing, an inner rod-like thermal element coaxially mounted within said outer thermal element, said thermal elements having different coefficients of expansion, a sealing and adjustment cap carried on each end of said outer thermal element to selectively vary the length of said outer thermal element, a small cylindrical element slidably retained within said outer thermal element, means positioned between said small cylindrical element and one of said adjustment caps for urging said small cylindrical element into engagement with said inner thermal element, a flexible tube connecting said outer thermal element and said casing, a flexible cable extending through said flexible tube and operatively connecting said small cylindrical element and a small operating button mounted on said valve actuating lever whereby said flexible cable transmits movement between said inner thermal element and said valve member, and resilient means positioned between said casing and said valve actuating lever and mounted substantially coaxial with a portion of said flexible cable for keeping said flexible cable in tension under all operating conditions of said device, said tensioned cable and said flexible tube having sufficient flexibility to allow repositioning of said thermal elements with respect to said casing without affecting the operation of said device.

References Cited in the file of this patent
UNITED STATES PATENTS

| | | |
|---|---|---|
| 1,059,197 | Mustee et al. | Apr. 15, 1913 |
| 1,829,416 | Lobley | Oct. 27, 1931 |
| 1,857,504 | Hartfield | May 10, 1932 |
| 1,875,548 | Baker | Sept. 6, 1932 |
| 2,705,746 | Strange | Apr. 5, 1955 |

FOREIGN PATENTS

| | | |
|---|---|---|
| 20,339 of 1907 | Great Britain | Sept. 14, 1908 |